July 10, 1956  U. RANZI  2,753,966
COUPLING
Filed Oct. 16, 1952
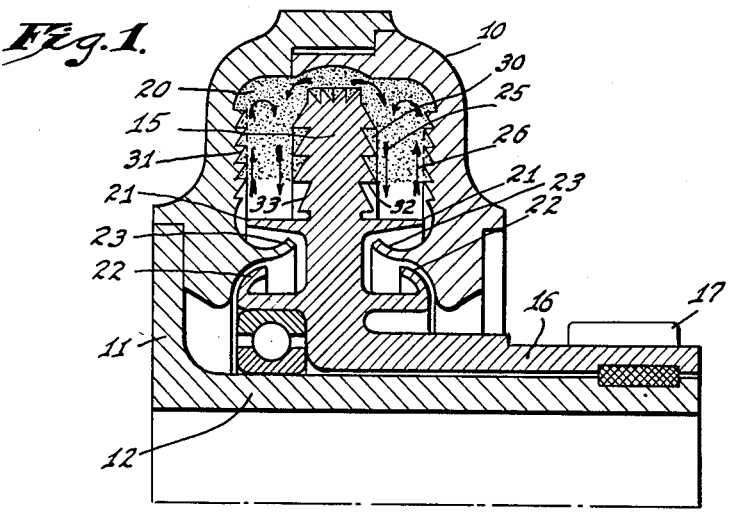
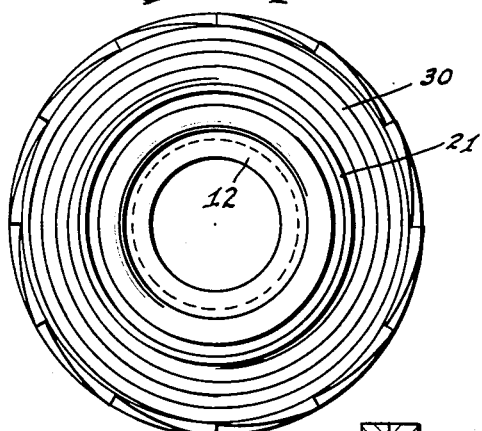
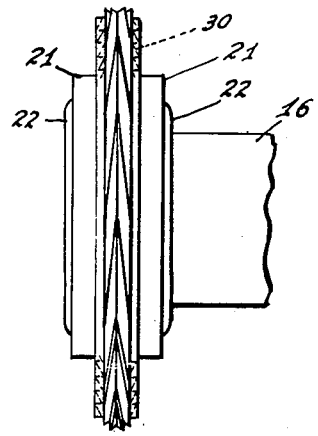
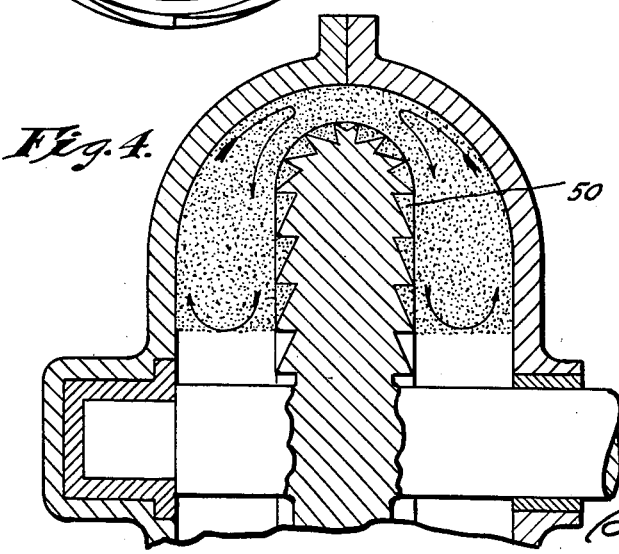
INVENTOR.
UBALDO RANZI,
BY
ATTORNEYS.

United States Patent Office 2,753,966
Patented July 10, 1956

2,753,966

COUPLING

Ubaldo Ranzi, Legnano, Italy

Application October 16, 1952, Serial No. 314,988

Claims priority, application Italy October 19, 1951

11 Claims. (Cl. 192—58)

This invention relates to torque transmitting couplings of the powder type. Such couplings, which have heretofore been known, include a supply of granular material confined in a space or spaces jointly defined by relatively rotatable driving and driven members, the torque being transmitted by friction from the driving member to the driven member through the granular material. When a powder clutch slips, heat is generated at the point of slippage, and the temperature of the adjacent granular material undergoes an increase which, coupled with the effects of pressure resulting from centrifugal force, may so effect the granular material as to interfere with its desired torque-transmitting function.

To reduce the extent of temperature rises and the adverse effects thereof, it has heretofore been proposed to so form the clutch members as to provide a circulatory path for the granular material and to equip one or both clutch members with means which will cause circulation of the granular material over such path when the two clutch members rotate relatively to each other. My co-pending United States applications Serial Nos. 746,458 and 179,173, filed respectively May 7, 1947, and August 14, 1950, now Patents Nos. 2,706,547 and 2,717,678, dated April 19, 1955 and September 13, 1955, respectively, show several such arrangements.

The present invention constitutes an improvement on the coupling shown in my aforesaid prior applications, and has for its object to produce a coupling providing a different type of powder-circulation, a more consistent and predictable performance, and an increase in the torque transmitted.

In the couplings of the prior applications above referred to, the powder-receiving space comprised, in effect, an endless conduit in which the powder moved in the same direction at all points in the cross-section of the conduit. In such a coupling, there is comparatively little friction between powder grains opposing circulation of the powder. In the present invention, I depart from that practice and so arrange the powder-containing space and the powder-circulating provisions that in a cross-section of the powder-containing space some of the powder will be moving in one direction and some in the opposite direction. This result is conveniently accomplished by providing the driving and driven members of the coupling with spaced, opposed faces defining a powder-containing space. Such opposed faces of the driving and driven members are in turn provided with grooves or ribs disposed obliquely with respect to the relative rotational movement that exists between the members and the powder when the coupling is slipping, the inclination of the grooves being such that the grooves on the driving member and the grooves on the driven member tend to displace the powder in opposite direction transversely of a circular path concentric with the axis of coupling rotation. Conveniently, the opposed faces defining the powder-containing space have a considerable radial extent and the grooves or ribs which cause powder circulation have a general spiral conformation. With such an arrangement, it is possible in some cases to eliminate the powder-circulating grooves or ribs on one of the coupling members and to dispose the grooves on the other coupling member so as to force the powder radially inward of the coupling in the event of slippage, centrifugal force being then relied on to cause outward flow of the powder in contact with the smooth face of the other coupling member.

The accompanying drawing illustrates my invention:

Fig. 1 is an axial section through one form of coupling embodying my invention;

Fig. 2 is an end elevation of the disc or driven member of the coupling shown in Fig. 1;

Fig. 3 is a side elevation of the disc embodied in the coupling of Fig. 1; and

Fig. 4 is a view similar to Fig. 1 illustrating a modified form of coupling.

In the coupling shown in Fig. 1, I provide a driving member in the form of a two-part casing 10 secured to a flange 11 on an inner sleeve 12 which is adapted to be mounted rigidly on a power-driven shaft. Within the casing is a disc 15 rigid with an outer sleeve 16 rotatably supported on the inner sleeve 12. The disc 15 constitutes the driven member of the coupling, and the sleeve 16 may be provided with gear teeth 17 for operatively connecting the coupling to the apparatus which it is to drive.

The disc 15 has axial and radial dimensions less than those of the interior of the housing 10 to provide space for a mass of powder 20 or other particulate material through which torque is to be transmitted from the driving housing to the driven disc. To prevent escape of powder, the disc may be provided inwardly from the powder-receiving space with radially spaced annular flanges 21 and 22 between which an annular flange 23 on the housing is loosely received.

The opposed radially extending faces of the disc and housing are provided with spirally inclined ribs or grooves which engage the powder and, when the coupling slips, induce radial displacement of the powder. Assuming that the driving member rotates in a clockwise direction, as indicated by the arrow in Fig. 2, slippage in the coupling will be accompanied by clockwise rotation of the casing relative to the powder and by clockwise rotation of the powder relative to the disc. The spiral grooves or ribs on the powder-engaging faces of the disc and housing are so inclined as to cause radial displacement of the engaged powder in opposite directions. Preferably, the ribs or grooves on the disc are disposed to urge the powder inwardly while those on the housing are arranged to urge the powder outwardly, as indicated by the arrows 25 and 26 in Fig. 1.

As indicated in Fig. 2, the preferred powder-circulating means takes the form of one or more continuous grooves 30 extending spirally from the periphery of the disc to a point adjacent the flange 21. The powder-circulating means provided on the housing may likewise comprise continuous spiral grooves 31. Desirably, the grooves 30 and 31 are triangular in cross-section, each being defined by a powder-propelling face 32 disposed generally normal to the direction of powder circulation and by a second face 33 extending obliquely outwardly in the direction of powder circulation from the base or inner edge of the face 32.

When a coupling of the type as so far described is placed in operation by the application of a driving torque to the housing 10, the powder tends to distribute itself peripherally within the housing under the influence of centrifugal force. Initially, only a small torque is transmitted through the powder to the driven member 15; and if any substantial torque opposes rotation of such driven member it remains stationary. As noted above, relative rotation of the driving and driven members will cause radial displacement of the powder which they respectively engage. Relative rotation between the powder in the grooves 30 or 31 and the immediately adjacent powder just outside those grooves will be opposed by the friction between powder grains, which will always be greater than the friction between the powder and the smooth groove-walls. As a result, the powder in the grooves will tend to rotate with the powder-mass and hence will move along the grooves and be displaced radially, carrying with it the adjacent powder located just outside the grooves. Because of the manner in which the grooves on the housing and disc are inclined, relative rotation of the driving and driven members will induce outward movement of the powder along the inner faces of the housing and inward movement of the powder along the side faces of the disc. If the powder mass between the opposed radially extending faces of the disc and housing is considered as made up of laminae defined by planes normal to the rotational axis, there will be relative radial movement between adjacent laminae. The powder lamina in contact with the housing-face will posses a relatively large outward velocity, and such outward velocity will decrease from lamina to lamina until, somewhere between the opposed faces, there will be a neutral lamina which is at rest radially. Beyond that neutral lamina the powder will be moving inwardly with an increasing velocity from lamina to lamina until, at the face of the disc, the highest inward velocity is attained.

Since the contiguous powder-laminae have different radial velocities, circulation of the powder as indicated by the arrows 25 and 26 will be opposed by friction within the powder mass. Such frictional opposition to rotation will be reflected as reactions on the groove-walls 32 of the disc and housing; and, because of the spiral inclination of such walls, the reactions will possess tangential components opposing relative rotation of the housing and disc. Thus, as a result of the friction within the powder mass, the torque transmitted by the coupling is increased.

As the speed of the driving housing increases while the driven disc remains at rest, two significant changes occur both of which increase the torque transmitted. Frist, the increase in the relative speed of the housing and disc increases the circulatory velocity of the powder, and tends of itself to increase the tangential reactions of the powder on the coupling members. Second, an increase in the speed of the housing increases the average rotational speed of the powder mass and increases the centrifugal face to which the powder is subjected. Powders possess, although to a lesser extent than liquids, the capability of transmitting pressure in all directions; and hence the increase in centrifugal force increases the pressure and the friction within the powder and between the powder and the coupling members.

When the torque transmitted to the driven member becomes sufficient to overcome its resistance to rotation, it begins to rotate. While the circulatory velocity of the powder may then decrease as a result of any decrease in the relative rotational velocity of the two coupling members, the increasing velocity of the disc will be accompanied by an increase in the average rotational velocity of the powder mass and by consequent increases in centrifugal force and pressures. The latter effects more than compensate for any reduction in circulatory velocity, and the transmitted torque continues to increase as the driven disc accelerates. If the resisting torque is not too large for the size of the coupling, a condition is eventually reached when the coupling "locks up" and transmits torque without any slippage between the driving and driven members.

As so far described, the coupling provides for no displacement of the powder lying between the axial limits of the disc and beyond the periphery thereof. A more effective circulation of the powder during slippage of the coupling can be effected by providing the cylindrical peripheral wall of the disc with grooves 40 helically inclined in opposite directions from the median plane of the disc in a direction to move the contiguous powder axially toward the sides of the disc during intervals in which the coupling is slipping.

In the modified form of coupling shown in Fig. 4, the peripheral wall of the disc is rounded, or general semi-circular in axial section, to join the side walls of the disc in smooth curves. The powder-displacing provisions of such a disc may take the form of grooves 50 which extend continuously from the median plane of the disc axially and inwardly around the curve of the periphery and then inwardly along the disc-sides.

Another difference between the coupling of Figs. 1 to 3 and that of Fig. 4 lies in the fact that in the latter there are no powder-circulating grooves in the housing. When such a coupling is slipping, the powder contiguous to the disc is moved inwardly by the disc-grooves and returns to the periphery of the housing along the housing wall under the influence of centrifugal force.

The particular material employed in the coupling may vary in character. Desirably it is relatively non-abrasive and capable of withstanding, without substantial change in character, the heat generated when the coupling is slipping. I prefer to use iron or steel shot, of the type used in shot blasting, and of a diameter between 0.02 and 0.08 inch. It is usually desirable to incorporate in such material a small proportion of a powdered, heat-stable lubricant, such as talc or graphite.

In both couplings shown, the grooves which move the powder radially inward are provided on the disc; but that arrangement, while preferred, is not essential. Neither is it essential that the grooves be spirally continuous. The mounting of the driving and driven members of the coupling on concentric sleeves is shown merely by way of example.

I claim:

1. In a powder coupling, a rotatable housing, a disc located within said housing and coaxial therewith, said housing and disc having spaced opposed faces defining a powder-receiving space, and a body of particulate material in such space, each of said spaced faces having a set of powder-engaging surfaces inclined with respect to their path of rotation to displace the particulate material transversely of such path and generally parallel to said opposed faces when the housing and disc rotate relatively to each other, the powder-engaging surfaces in the disc being so disposed relatively to those on the housing that the two sets displace the particulate material in opposite directions.

2. A coupling as set forth in claim 1 with the addition that said opposed faces have radial extent, one set of surfaces displacing the particulate material inwardly and the other displacing it outwardly.

3. A coupling as set forth in claim 2 with the addition that it is the surfaces on the disc which displace the particulate material inwardly.

4. In a powder coupling, a rotatable housing, a disc located within said housing and coaxial therewith, said housing and disc having peripheral and side walls spaced apart in opposed relation to define a powder-receiving space extending around the periphery of the disc and inwardly along both sides thereof, a supply of particulate material in said space, powder-engaging surfaces on the periphery of the disc helically inclined to displace particulate material in opposite axial directions from the median plane of the disc toward the sides thereof, and spirally inclined powder-engaging surfaces on the sides of the disc for displacing the contiguous particulate material inwardly when the housing and disc rotate relatively to each other.

5. A coupling as set forth in claim 4 with the addition that said powder-engaging surfaces are continuous grooves extending first generally helically in opposite axial directions from the median plane of the disc and then spirally inwardly along the sides of the disc.

6. In a powder coupling, a rotatable housing, a disc in said housing and rotatable relatively thereto, said housing having a side wall provided with a central opening, a torque-transmitting member rigid with said disc and projecting axially through said opening, said disc and housing having outwardly from said opening opposed surfaces spaced apart to provide a powder-receiving space, a supply of particulate material in such space, and means for inhibiting the escape of particulate through said opening, said means comprising nested, axially overlapping annular flanges provided respectively on the housing and disc, at least one of said disc and housing being provided outwardly beyond said flanges with helically inclined surfaces for inducing a circulation within said particulate material when the housing and disc rotate relatively to each other.

7. In a powder coupling, a rotatable housing element, a disk element located within said housing and coaxial therewith, said elements having spaced, opposed, radially extending side faces defining a powder-receiving space, a supply of particulate material in such space, and means for causing toroidal circulation of such particulate material in said space upon relative rotation of said two elements, said means including spirally inclined powder-engaging surfaces on the side face of one of said elements, the spiral inclination of such surfaces being such as to displace the particulate material radially inward when said elements rotate relative to each other.

8. A powder coupling as set forth in claim 7 with the addition that said spirally inclined surfaces are provided on the side face of said disk.

9. A powder coupling as set forth in claim 8 with the addition that said disk has at its rim powder-engaging surfaces helically inclined to displace the contiguous particulate material axially toward the side of the disk when the housing and disk rotate relatively to each other.

10. In a powder coupling, a rotatable housing element, a disk element located within said housing and coaxial therewith, said elements having spaced, opposed, radially extending side faces defining a powder-receiving space, a supply of particulate material in such space, and means for causing toroidal circulation of such particulate material in said space upon relative rotation of said two elements, said means including spirally inclined powder-engaging surfaces on the side face of one of said elements, the side face of the other of such elements being smooth and free from obstructions interfering with such toroidal circulation, the spiral inclination of such surfaces being such as to displace the particulate material radially inward when said elements rotate relative to each other.

11. A powder coupling as set forth in claim 10 with the addition that said powder-engaging surfaces are provided on the face of said disk, the opposed side face of said housing being smooth and free from obstructions interfering with such toroidal circulation.

References Cited in the file of this patent

UNITED STATES PATENTS

| | | |
|---|---|---|
| 1,887,610 | Widegren et al. | Nov. 15, 1932 |
| 2,525,571 | Winther | Oct. 10, 1950 |
| 2,569,087 | Alexandrescu | Sept. 25, 1951 |

FOREIGN PATENTS

| | | |
|---|---|---|
| 920,562 | France | Jan. 4, 1947 |